US009250429B2

(12) United States Patent
Gugel et al.

(10) Patent No.: US 9,250,429 B2
(45) Date of Patent: Feb. 2, 2016

(54) PHASE FILTERS FOR A SCANNING MICROSCOPE

(75) Inventors: Hilmar Gugel, Dossenheim (DE); Arnold Giske, Heidelberg (DE); Marcus Dyba, Heidelberg (DE); Roland Seifert, Heidelberg (DE); Bernd Widzgowski, Dossenheim (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 361 days.

(21) Appl. No.: 13/486,652

(22) Filed: Jun. 1, 2012

(65) Prior Publication Data

US 2012/0236398 A1 Sep. 20, 2012

Related U.S. Application Data

(63) Continuation of application No. PCT/EP2010/007236, filed on Nov. 30, 2010.

(30) Foreign Application Priority Data

Dec. 1, 2009 (DE) .......................... 10 2009 056 250

(51) Int. Cl.
*G02B 21/00* (2006.01)
*G02B 5/22* (2006.01)
*G02B 21/24* (2006.01)

(52) U.S. Cl.
CPC ........ *G02B 21/0076* (2013.01); *G02B 21/0032* (2013.01); *G02B 21/248* (2013.01)

(58) Field of Classification Search
None
See application file for complete search history.

(56) References Cited

U.S. PATENT DOCUMENTS

| 6,052,223 | A | * | 4/2000 | Yoneyama et al. ........... 359/381 |
| 6,323,995 | B1 | | 11/2001 | Takahama et al. |
| 7,679,830 | B2 | * | 3/2010 | Dowski, Jr. ................... 359/637 |
| 2007/0023686 | A1 | | 2/2007 | Wolleschensky et al. |

FOREIGN PATENT DOCUMENTS

| DE | 103 14 750 A1 | 11/2004 |
| DE | 103 40 965 A1 | 3/2005 |
| DE | 20 2009 007250 U1 | 11/2009 |
| EP | 1 944 600 A2 | 7/2008 |
| JP | H11326777 A | 11/1999 |
| JP | 2003084206 A | 3/2003 |
| JP | 2005121479 A | 5/2005 |
| JP | 2006023745 A | 1/2006 |
| JP | 2009115902 A | 5/2009 |
| WO | 2006/097063 A1 | 9/2006 |
| WO | 2009/051081 A1 | 4/2009 |

OTHER PUBLICATIONS

International Search Report dated Mar. 18, 2011, from counterpart International Application No. PCT/EP2010/007236 filed Nov. 30, 2010.

* cited by examiner

*Primary Examiner* — Jade R Chwasz
(74) *Attorney, Agent, or Firm* — Patentbar International, P.C.

(57) ABSTRACT

An optical device includes: a focusing optic that focuses a light beam in a focal plane; at least two phase filters for selectively focusing the light beam and effecting a phase shift of the light beam; and a filter wheel supporting the at least two phase filters which are individually introducible along an optical axis of the light beam, where the filter wheel is rotationally adjusted in relation to the optical axis by a stepper motor and linearly adjusted in an r-direction along a plane of the filter wheel by a linear adjustment mechanism.

19 Claims, 4 Drawing Sheets

PHASE FILTERS FOR A SCANNING MICROSCOPE

RELATED APPLICATIONS

This application is a Continuation of PCT application serial number PCT/EP2010/007236 filed on Dec. 30, 2010 which claims priority to German Patent Application No. 10 2009 056 250.8 filed on Dec. 1, 2009, both of which are incorporated herein by reference in their entirety.

BACKGROUND OF THE INVENTION

The invention relates to an optical device with a focusing optic which focuses a minimum of one light beam in a focal plane, and a phase filter to form the focus of the light beam such that the phase filter effects a phase shift of the light beam.

The invention further relates to a scanning microscope with a focusing optic which focuses a light beam in a focal plane, and with a phase filter to form the focus of the light beam such that the phase filter effects a phase shift of the light beam.

In scanning microscopy, a sample is illuminated with a light beam for the purpose of observing the reflected or fluorescent light emitted by the sample. The focus of the illumination light beam is moved in an object plane with the help of a controllable beam deflection device (scanning device), generally by tilting two minors, with the deflection axes usually positioned perpendicular to each other so that one minor deflects in the x-direction and the other in the y-direction.

A confocal scanning microscope generally comprises a light source, a focusing optic with which the light from the source is focused on a pinhole aperture, a beam splitter, a beam deflector to control the beam, a microscope optic, a detection aperture, and detectors to detect the detection light or fluorescent light. The illumination light is coupled via a beam splitter. The fluorescent light or reflection light coming from the object returns to the beam splitter via the beam deflector, traverses this, and is subsequently focused on the detection aperture, behind which are located the detectors. Detection light that does not originate directly from the focal plane takes another light path and does not pass through the detection apertures so that one obtains point information by which a three-dimensional image is constructed by sequential scanning of the object. In most cases, a three-dimensional image is achieved fromdatafrom layered imaging.

The resolution of a confocal scanning microscope is, among other things, dependent on the intensity distribution and the spatial spread of the focus of the excitation light beam. One possibility for increasing the resolution is provided by STED (Stimulated Emission Depletion) microscopy as it was developed by Prof. Stefan Hell. Here, the lateral edge regions of the focus volume of the excitation light beam are illuminated with a light beam of another wavelength, the so-called stimulation light beam or by the de-excitation light beam, which is preferably emitted by a second laser, in order, stimulated there by the sample regions excited by the first laser (i.e., the fluorescent molecules located there), to be brought back to the ground state. Only the spontaneously emitted light from the regions not illuminated by the second laser are detected so that an overall improvement in resolution is achieved.

It has been demonstrated that it is possible to achieve an improvement in resolution both laterally and axially if the focus of the stimulation light beam can ideally be formed on the inside as a zero position, namely in all three spatial directions. Visually, this means that a hollow sphere is formed in the inside of the intensity profile of the stimulation light beam in which the intensity of the stimulation light beam is zero, i.e., no beam is present. The form of the stimulation focus results from the Fourier transforms of the phase filter function. A number of different phase filters are known. For example, there is the so-called vortex phase filter or axial phase filter as, for example, described in Appl. Phys. Lett., Vol. 82, No. 18, 5 May 2003, 3125-3127. Using an axial phase filter, the light that traverses the central part of the plate is delayed by half a wavelength opposite the edge region of the plate. In the process, the portion of the light that traverses the central region must be the same as the portion that traverses the edge region. This leads by means of interference effects to an extinguishing of the light beam in the central region. In practice, it is often not possible to achieve a very great improvement in resolution in both the lateral and in the axial direction equally because the ideal hollow sphere depicted is difficult to produce. Therefore, the decision is often made for an arrangement by which high resolution may be achieved either in the lateral or in the axial direction, depending on the particular application.

In addition, different wavelengths for the excitation and de-excitation light must be used for different fluorescent dyes. However, the known phase filters have a disadvantage in that they precisely implement only one phase shift which leads to the desired intensity distribution in the focus for only one particular light wavelength. They are therefore generally applicable for only a narrow wavelength band of approximately 60 nm around the central wavelength. This is, however, a great disadvantage because fluorescent dyes occur in a broad range of wavelengths, and various fluorescent dyes are used for certain biological applications. Then, however, because the phase filters are not attuned to this fluorescent dye, only poorer resolution is achievable.

SUMMARY OF THE INVENTION

The problem underlying the invention is to disclose an optical device that enables a largely wavelength-independent focus formation of a light beam, thereby enabling high-resolution microscopy, in particular STED microscopy, over a large wavelength spectrum.

The problem is solved by an optical device, wherein at least two phase filters are arranged on a support. Advantageously, the support is a filter wheel or a filter slider, which is introduced into the beam path of a light beam. Preferably, this is the beam path of the stimulation light beam in an STED microscope. Preferably, a plurality of phase filters are arranged in a matrix on the support. Advantageously, the support is a glass substrate to which the particular phase filters are applied. Expediently, there is for purposes of adjustment another position on the support which, when it is passed through does not influence the wavefront of the light, i.e., there is an empty position in which there is no phase filter.

To adjust the beam path of the light, the empty position, i.e., the position in the filter wheel or filter slider in which there is no phase filter, is set in the beam path so that the beam path, beginning from the laser output or the excitation pinhole or an end of the light-conducting fiber into which the laser was coupled can be adjusted until focused in the sample plane without being influenced by a phase filter. This is especially advantageous if, for example, an adjustment method is used as described in DE102007011305A1 for the adjustment of two light beams, as is required in STED microscopy.

Advantageously, the phase filters should be located in the pupil of the microscope objective or in a conjugated plane to it. Because, however, the phase filters cannot for structural reasons generally be mounted directly in the objective pupil, they are either placed as close as possible to the objective pupil or imaged in the objective pupil using an imaging optic.

The phase filter is adjusted in relation to the optical axis of the microscope so that it or its image are arranged centrically in the pupil of the objective. When using a filter wheel for the phase filter, it is necessary that when rotating the filter wheel, the midpoint of each individual phase filters is imageable on the midpoint of the pupil of the objective. Therefore, it is necessary that the rotational axis of the filter wheel be adjusted accordingly so that when the wheel is rotated the midpoint of each particular phase filter is congruent with the midpoint of the pupil. It is especially advantageous when using a filter wheel to use a polar coordinate system for the adjustment, and to define the midpoint of the filter wheel by a distance and an angle. The filter wheel can be rotated by a motor. The placement of the individual phase filters in the beam path can be controlled electronically by a computer. Exact positioning of the individual phase filters in relation to the midpoint of the objective pupil is necessary. To measure the phase filter position, a highly precise measuring system such as a magnetoresistive measuring system is used, by which precise measurement of the position of the particular phase filter that has been swiveled into the beam path is possible.

The phase filter may, for example, be adjusted as follows: The position of the rotational axis of the filter wheel is first adjusted by hand along the optical axis of the light beam, and the particular phase filters are then adjusted by rotating the filter wheel. The following embodiment is especially advantageous: In the r-direction, the circle of the individual phase filter positions is aligned in the beam path by means of a fine adjustment screw. In the φ-direction, the exact φ-position is set by rotating the wheel by means of a step motor drive. The rotational position can be exactly and reproducibly set by using a sensor, preferably a magnetoresistive sensor in connection with a magnetic pole wheel, which is mounted directly to the phase filter wheel. It is also conceivable that the setting of the r-direction may also be accomplished using a sensor. In so doing, adjustment can be automatically controlled using a computer-implemented algorithm. The measured values of the correct wheel positions may advantageously be stored electronically in a data table. During later positioning of the phase filter matrix in operation, the phase filters are placed using an iterative process in which the filter wheel is rotated and the current position measured. If the target position has not yet been achieved, the wheel is moved again and the current position measured, etc., until the end position has been reached. Another procedure for correct positioning is the use of a position regulator. By adjusting the phase filter matrix in relation to the optical axis, optimal positioning of the phase filter matrix or of its image in the pupil can be achieved. This process can also be motorized in order, for example, to achieve automatically the correct setting for different objectives with different pupil positions. Here, too, a data table may be used. The selection of objectives is controlled by computer. By so doing, the phase filter may be positioned for each selected objective.

In order to achieve an increase in both lateral and axial resolution in a microscope, the phase filter matrix can be equipped with both phase filters that increase lateral resolution and with phase filters that increase axial resolution. Alternatively, when using STED microscopy, for example, the stimulation beam may be split into two partial beams by a beam splitter. A polarization splitter may, for example, be used for the purpose, and the ratio of the light power of the two partial beams can be set using a λ/2-plate. Each of the two partial beams can pass through a phase filter, each of the two phase filters then being part of the phase filter support according to the invention. After passage of the two partial beams through the particular phase filter, the two partial beams are again superimposed on each other so that, if possible, a sort of hollow sphere is formed in the focus of the stimulation beam, thereby facilitating high-resolution of the STED microscope in both the lateral and axial direction. In this embodiment, a support is equipped only with phase filters that increase lateral resolution, and the other support only with phase filters that increase axial resolution. As a result, in addition to the two extreme positions—an increase only in lateral resolution or only in axial resolution—an increase in combined lateral and axial resolution is facilitated.

It is also conceivable that various de-excitation lasers can be used simultaneously, one laser always being allocated to a specific phase filter. These may be located on various phase filter supports. For STED microscopy, it is necessary that the focus of the excitation light and the focus of the stimulation light or of the de-excitation light be precisely superimposed, i.e., the permissible deviation be less than 100 nm. In order to achieve this, it is advantageous if the laser used is coupled into the STED microscope by means of a light-conducting fiber. Then all of the light beams come, so to speak, from one point light source so that if the system components of the microscope experience drift, the position of the focuses in relation to each other remains unchanged. In practical implementation, it is often advantageous to use two different fibers for the excitation and de-excitation light because of the different properties of the excitation and the de-excitation light. Different fibers may potentially be used for different de-excitation wavelengths in order, for example, always to be able to guide the light in monomode. The use of a point light source or a light-conducting fiber from which comes light of various wavelengths requires a correspondingly good corrective optic. In particular, chromatic aberrations in the wavelengths involved must be corrected to 100 nm in the focus. This is especially necessary for multicolor images in which several fluorescent markers are used, and which are excited or de-excited using different excitation lasers and/or de-excitation lasers.

For maximum flexibility, the lasers are coupled using an acusto-optical beam splitter (AOBS). To this end, one AOBS may be used for all wavelengths, or several AOBS, for example, a first to couple the excitation light and a second to couple the de-excitation light.

The phase filters or the phase filter may be selected via the software user interface. This then controls the electronics and the mechanics to position the phase filters. There are several possibilities for structuring user input. A first possibility is that the user selects the appropriate phase filter or the appropriate phase filters directly from the user interface. Another possibility is to link selection of the phase filter or of the phase filters to the particular de-excitation laser or de-excitation wavelengths used. Thus, for example, when selecting a de-excitation laser with a wavelength of 592 nm, the phase filter can be set for 592 nm or the phase filter of the corresponding wavelength band introduced. Reference tables may be created and used for the purpose. It is also conceivable that when simultaneously using phase filters that increase lateral resolution and phase filters that increase axial resolution, the user enters the desired values for lateral and axial resolution into the user interface. The software then controls the electronics and mechanics accordingly so that the phase filters for increasing lateral and axial resolution necessary for this laser are moved into the beam path and the light power is split between the two paths, for example by rotating a λ/2-plate, such that the corresponding ratio corresponds to the ratio of the resolution increases in the lateral and axial direction.

Reference tables may also be used for this purpose. Setting the laser power of the de-excitation laser also sets the resolution in the STED microscope. This is possible because the increase in resolution in a STED microscope in comparison to a conventional confocal microscope is proportional to the square root of the laser power of the de-excitation laser. Here, too, reference tables may be used and/or the individual values can be calculated

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

The subject matter of the invention is shown schematically in the diagram and is described below based on the figures. They show.

DETAILED DESCRIPTION OF THE PREFERRED EMBODIMENTS

While this invention has been particularly shown and described with references to preferred embodiments thereof, it will be understood by those skilled in the art that various changes in form and details may be made therein without departing from the scope of the invention encompassed by the appended claims.

Figure 1:
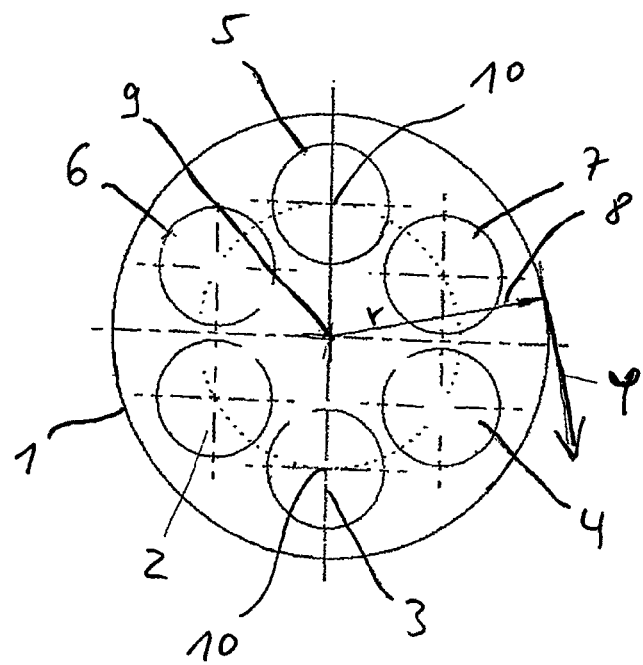
FIG. 1 a support with several phase filters according to the invention.

FIG. 1 shows a support 1 according to the invention with a minimum of two phase filters 2, 3. The support 1 is shown here implemented as a filter wheel, and in addition to the two phase filters 2, 3 the filter wheel also comprises other phase filters 4, 5, and 6, which are arranged in a ring on the support. Advantageously, the support is a glass substrate to which the phase filters are applied. Expediently, there is for adjustment purposes an additional position 7 on the support 1, which does not influence the wavefront of the light during passage, i.e., it is an empty position in which no phase filter is present.

The optical axis 10 always runs perpendicularly through the middle of a position of a phase filter on the filter wheel. For adjustment purposes, both directions 8 and 9 are provided such that in a polar coordinate system this means the length of radius r and the angle φ.

Figure 2:
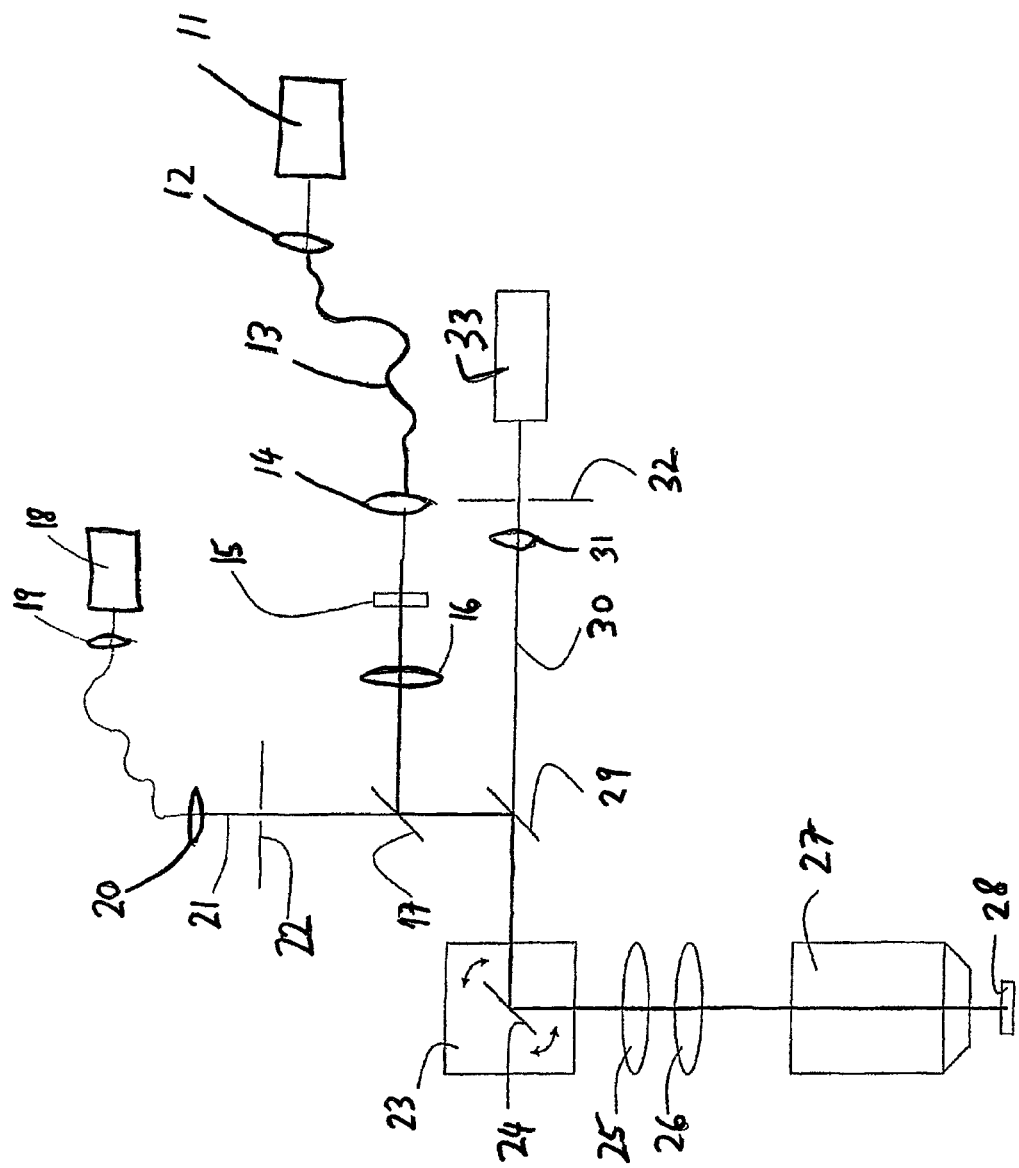
FIG. 2 a scanning microscope according to the invention.

FIG. 2 shows a scanning microscope according to the invention, here in particular for STED microscopy. Two lasers 11, 18 are provided, laser 18 emitting light 21 to excite the sample, which is guided via a first optic 19, a not further indicated light-conducting fiber, and a second optic 20 to an illumination pin hole 22. The excitation light 21 then strikes a first beam splitter 17 and a second beam splitter 29 and reaches the scanning module 23. The scanning module 23 has one or several scanning mirrors. Alternatively, acusto-optical elements are also conceivable. Finally, the excitation light 21 reaches the objective 27 via two further optics 25, 26, and then strikes the sample 28.

The laser 11 emits light for de-excitation, which strikes the phase filter matrix according to the invention 15 after passing through a first optic 12, a light-conducting fiber 13, and a second optic 14. The phase filter matrix comprises a support 1, which is equipped with at least two phase filters. After reflecting on the beam splitter 17, the light follows the same path to the sample 28 as does the excitation light 21.

Figure 3:
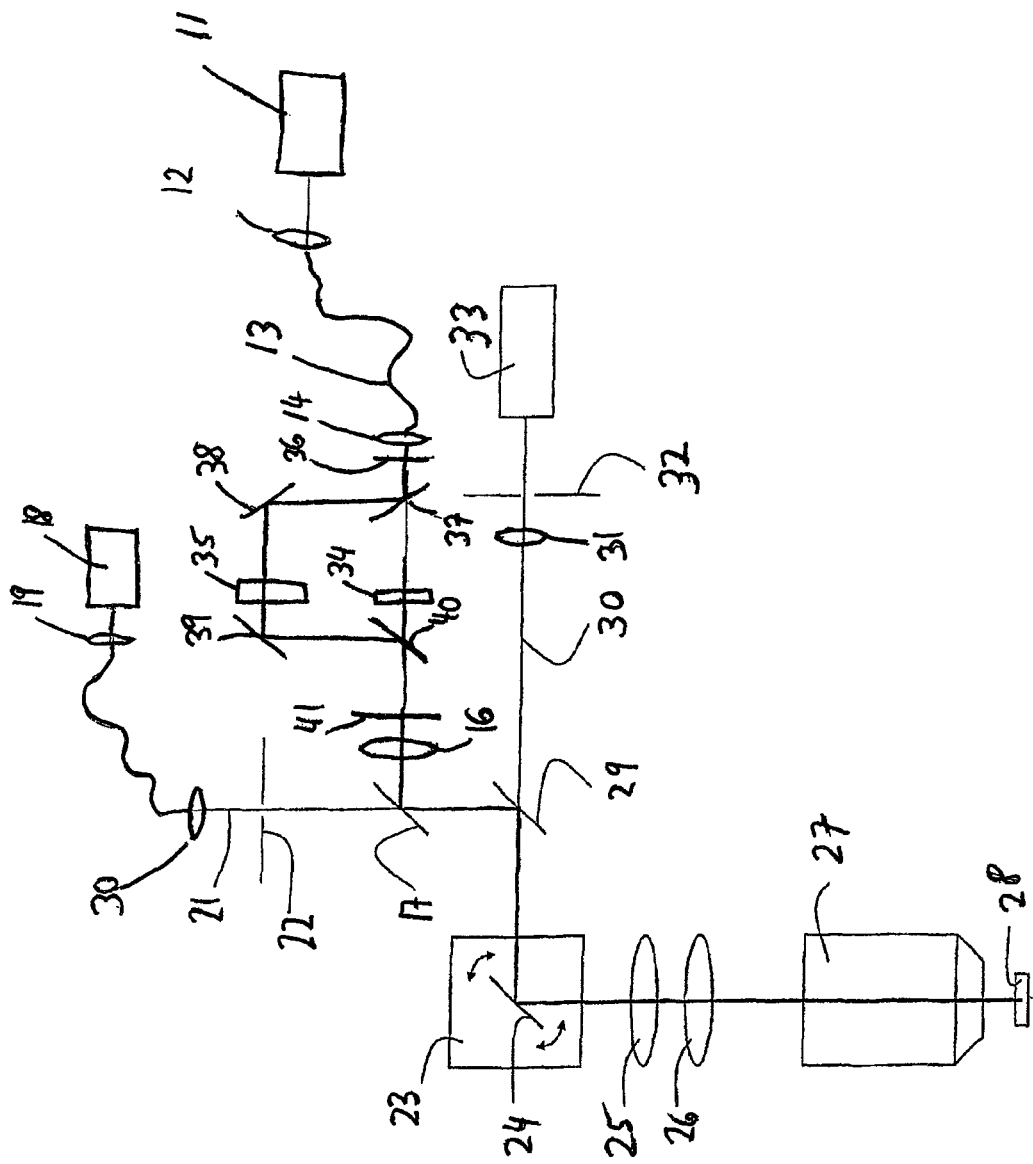
FIG. 3 a second scanning microscope according to the invention.

FIG. 3 shows a second scanning microscope according to the invention, in particular for STED microscopy, in which elements with the same functions as in FIG. 2 are labeled with the same reference numbers. In addition to the representation in FIG. 2, here a λ/2-plate is envisaged as well as a polarization beam splitter 37, which splits the laser beam into two partial beams. The traversing part of the laser beam strikes a first phase filter matrix 34, and after passing through a beam splitter 40 is again brought together with another partial beam. The reflected part of the light beam strikes a mirror 38 and then a second phase filter matrix 35. After deflection by a mirror 39 and the beam splitter 40, it again meets with the other part of the laser beam. Both of the now reunited light beams now traverse a λ/4 plate 41. The de-excitation laser beam is thus split by this arrangement, and the two partial beams each pass through different phase filters 34, 35 so that axial and lateral resolution may be influenced as a result.

Figure 4:
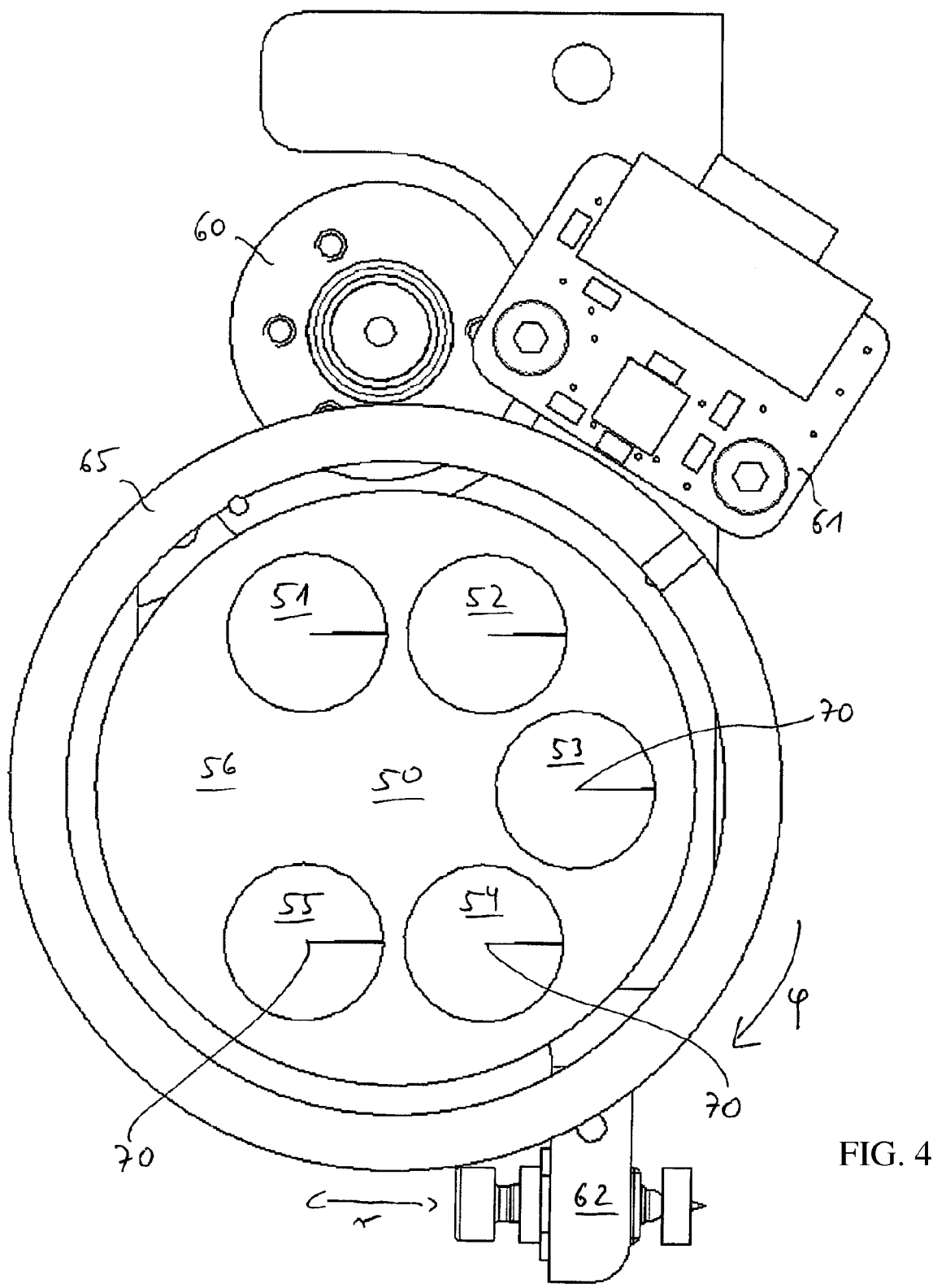
FIG. 4 an embodiment of a support according to FIG. 1 with several phase filters.

FIG. 4 shows an embodiment of a support 1 according to the invention with several phase filters. The support 1 is here implemented as a filter wheel 50 with several phase filters 51, 52, 53, 54, and 55. The filter wheel 50 is an optically transparent material such as glass or plastic, and the phase filters 51-55 are applied to the filter wheel 50. Expediently for adjustment purposes, there is another position 56 on support 1, in which light is not influenced by its passage, i.e., it is envisaged as an empty position. The optical axis 70 is located perpendicular to the surface of the filter wheel 1, 50.

To adjust the beam path of the light, the empty position 7, 56 is set in the beam path so that the beam path beginning from the laser output 11 or the excitation pinhole or one end of a light-conducting fiber in which the laser 11 has been coupled can be adjusted until focused in the sample plane 28 without being influenced by the phase filters 2-6, 51-55. This can be especially advantageous when, for example, an adjustment method as described in DE102007011305A1 is used to adjust two light beams, as is required in STED microscopy.

Advantageously, the phase filters 2-6, 51-55 should be located in the pupil of the microscope objective 27 or on a plane conjugated to it. Because the phase filters 2-6, 51-55 generally cannot be built into the objective pupil directly for structural reasons, they are either placed as close as possible to the objective pupil or imaged in the objective pupil using an imaging optic. The phase filter is adjusted in relation to the optical axis of the microscope so that it or its image are arranged centrically in the pupil of the objective. When using a filter wheel 1, 50 for the phase filter, it is necessary that when rotating the filter wheel 1, 50, the midpoint of each individual phase filters 2-6, 51-55 be imageable on the midpoint of the pupil of the objective. Therefore, it is necessary that the rotational axis of the filter wheel 1, 50 has been adjusted accordingly so that when the wheel is rotated, the midpoint of each particular phase filter 2-6, 51-55 is congruent with the midpoint of the pupil. The filter wheel can be rotated by a motor 60. The placement of the individual phase filters 2-6, 51-55 in the beam path can be controlled electronically by a computer, the exact positioning of the individual phase filters in relation to the midpoint of the objective pupil being necessary. To measure the phase filter position, a highly precise measuring system 61 such as a magnetoresistive measuring system is used, with which precise measurement of the position of the particular phase filter that has been swiveled into the beam path is facilitated. However, other measurement methods—optical or electronic—are conceivable. The phase filter may, for example, be adjusted as follows: The position of the rotational axis of the filter wheel 1, 50 is first adjusted by hand along the optical axis of the light beam, and the particular phase filters are then adjusted by rotating the filter wheel. The following embodiment is especially advantageous: In the r-direction, the circle of the individual phase filter positions is aligned in the beam path by means of a fine adjustment screw 62. The two degrees of freedom of adjustment are (a) the positionability along a sliding direction r and (b) the movement along a rotational axis φ. The embodiment shown in FIG. 4 is especially advantageous: In the x-direction (sliding direction r), the circle of the individual phase filter positions is aligned in the beam path by means of a fine adjustment screw. In the Y-direction (rotational direction φ), the exact y-position is set by rotating the wheel 1, 50 by means of a step motor drive 60. The rotational position can be exactly and reproducibly set by using a sensor 61, advantageously a magnetoresistive sensor in connection with a magnetic pole wheel 65, which is mounted directly to the phase filter wheel 50. It is also conceivable that the x-direction may be set using a sensor (not shown here). In so doing, adjustment can be automatically controlled using a computer-implemented algorithm.

Advantageously, the measured values of the correct wheel positions may be stored electronically in a data table. During later positioning of the phase filter matrix in operation, the phase filters are placed using an iterative process in which the filter wheel 1, 50 is rotated and the current position measured. If the target position has not yet been achieved, the wheel 1, 50 is moved again and the current position measured, etc., until the end position has been reached.

Another procedure for correct positioning is the use of a position regulator. By adjusting the phase filter matrix 1, 50 in relation to the optical axis 70, optimal positioning of the phase filter matrix 1, 50 or of its image in the pupil can be achieved. This process can also be motorized in order, for example, to achieve automatically the correct setting for different objectives with different pupil positions. Here, too, a data table may be used. The selection of objectives is controlled by computer. By so doing, the phase filter 2-6, 51-55 may be appropriately positioned for each selected objective.

What is claimed is:

1. An optical device comprising:
    a focusing optic that focuses a light beam in a focal plane at a location of a sample;
    at least two phase filters each selectively forming a focus of the light beam and effecting a phase shift of at least a part of the light beam; and
    a support being a filter wheel with a center and a radius, said support supporting the at least two phase filters arranged in a ring around the center of the support wherein, in order to position a midpoint of one of the at least two phase filters to be congruent with a midpoint of a pupil of the focusing optic, said support is rotated about the center and in relation to an optical axis by a motor and moved in a linear direction along a plane of the support by a linear adjustment mechanism.

2. The optical device according to claim 1, wherein the linear adjustment mechanism is a fine adjustment screw.

3. The optical device according to claim 2, wherein the positioning of the phase filter along the optical axis of the light beam can be controlled electronically by a computer.

4. The optical device according to claim 1, wherein the filter wheel support is implemented as a glass substrate to which the phase filters are applied.

5. The optical device according to claim 4, wherein there is a position on the filter wheel support, passage through which does not influence the wavefront of the light.

6. The optical device according to claim 5, wherein the position is an empty position in which there is no phase filter.

7. The optical device according to claim 1, wherein a sensor is provided for setting a rotational position of the filter wheel support.

8. The optical device according to claim 7, wherein the sensor is implemented as a combination of a magnetoresistive sensor and a magnetic pole wheel that is directly mounted to the filter wheel support.

9. The optical device according to claim 1, wherein the filter wheel support is adjusted by means of an algorithm in a computer.

10. The optical device according to claim 1, wherein the phase filters are implemented such that they effect an increase in resolution in at least one of an axial and a lateral direction.

11. The optical device according to claim 1, wherein the phase filters are located in a pupil of a microscope objective or in a plane conjugated to it.

12. A scanning microscope comprising:
    a focusing optic that focuses a light beam in a focal plane at a sample location;
    at least two phase filters each selectively forming a focus of the light beam and effecting a phase shift of at least a part of the light beam; and
    a support being a filter wheel with a center and a radius, said support supporting the at least two phase filters arranged in a ring around the center of the support wherein, said support is rotated about the center and in relation to an optical axis by a motor and moved in a linear direction along a plane of the support by a linear adjustment mechanism.

13. The scanning microscope according to claim 12, wherein the linear adjustment mechanism is a fine adjustment screw.

14. The scanning microscope according to claim 13, wherein the filter wheel support is implemented as a glass substrate to which the phase filters are applied.

15. The scanning microscope according to claim 13, wherein there is a position on the filter wheel support that does not influence the wavefront of the light.

16. The scanning microscope according to claim 15, wherein the position is an empty position in which there is no phase filter.

17. The scanning microscope according to claim 12, wherein the microscope is a STED microscope with an excitation and a de-excitation laser, and the at least two phase filters are provided for the de-excitation laser.

18. The scanning microscope according to claim 12, wherein the light beam is a laser light beam and the phase filters are selected depending on the laser used.

19. The scanning microscope according to claim 18, wherein the microscope is a STED microscope with an excitation and a de-excitation laser, and the phase filters are provided for the de-excitation laser.

* * * * *